Figure 1:
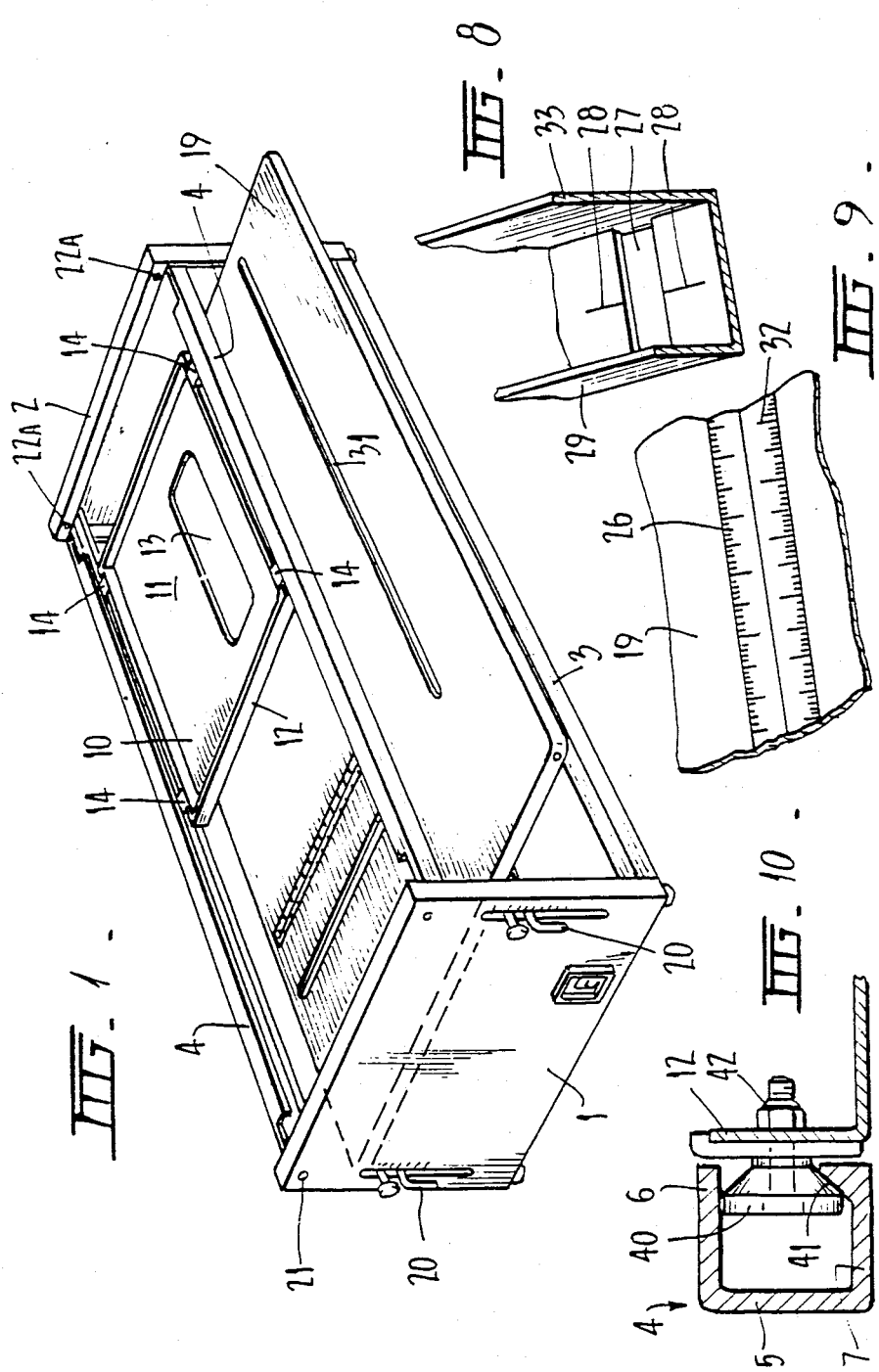

United States Patent [19]

Lewin

[11] Patent Number: 4,502,518

[45] Date of Patent: Mar. 5, 1985

[54] WORK TABLE FOR SAWS AND OTHER TOOLS

[76] Inventor: George Lewin, 21 Norman St., McKinnon, Vic. 3204, Australia

[21] Appl. No.: 495,402

[22] Filed: May 17, 1983

[30] Foreign Application Priority Data

May 20, 1982 [AU] Australia .............................. PF4085

[51] Int. Cl.³ .............................................. B27B 5/18
[52] U.S. Cl. ............................ 144/286 A; 144/286 R; 144/1 R; 83/477.2; 83/574
[58] Field of Search ...................... 83/522, 574, 477.2; 144/286 R, 286 A, 1 R, 287

[56] References Cited

U.S. PATENT DOCUMENTS

| | | | |
|---|---|---|---|
| 4,133,237 | 1/1979 | Lewin | 83/574 |
| 4,186,784 | 2/1980 | Stone | 83/574 |
| 4,201,254 | 5/1980 | Fehric | 144/1 R |

Primary Examiner—W. D. Bray
Assistant Examiner—Jorji M. Griffin
Attorney, Agent, or Firm—Murray, Whisenhunt and Ferguson

[57] ABSTRACT

A work table for a saw includes a pair of parallel spaced apart horizontally extending guide channels, each guide channel having a vertical web and upper and lower horizontal flanges, the open sides of the channels facing one another; a saw support plate having two pairs of runners for supporting the saw support plate, one pair of runners at one end of the plate and projecting outwardly from the sides of the plate and the other pair of runners at the other end of the plate and projecting outwardly from the sides of the plate. The runners are received within the channels to support the saw support plate in a horizontal plane and the saw support plate is movable in a horizontal plane. The guide channels are provided with apertures in their upper flanges through which the runners may pass, whereby a pair of runners may be lifted from the channels to rotate the saw support in a vertical plane to invert the saw plate and then the runners may be reengaged with the channels. A saw secured to the saw support plate can thus be readily converted from a bench saw mode to a docking saw mode. The work table also includes a work support plate which can be positioned above or below the saw for operation in either mode.

10 Claims, 10 Drawing Figures

U.S. Patent  Mar. 5, 1985  Sheet 1 of 3  4,502,518

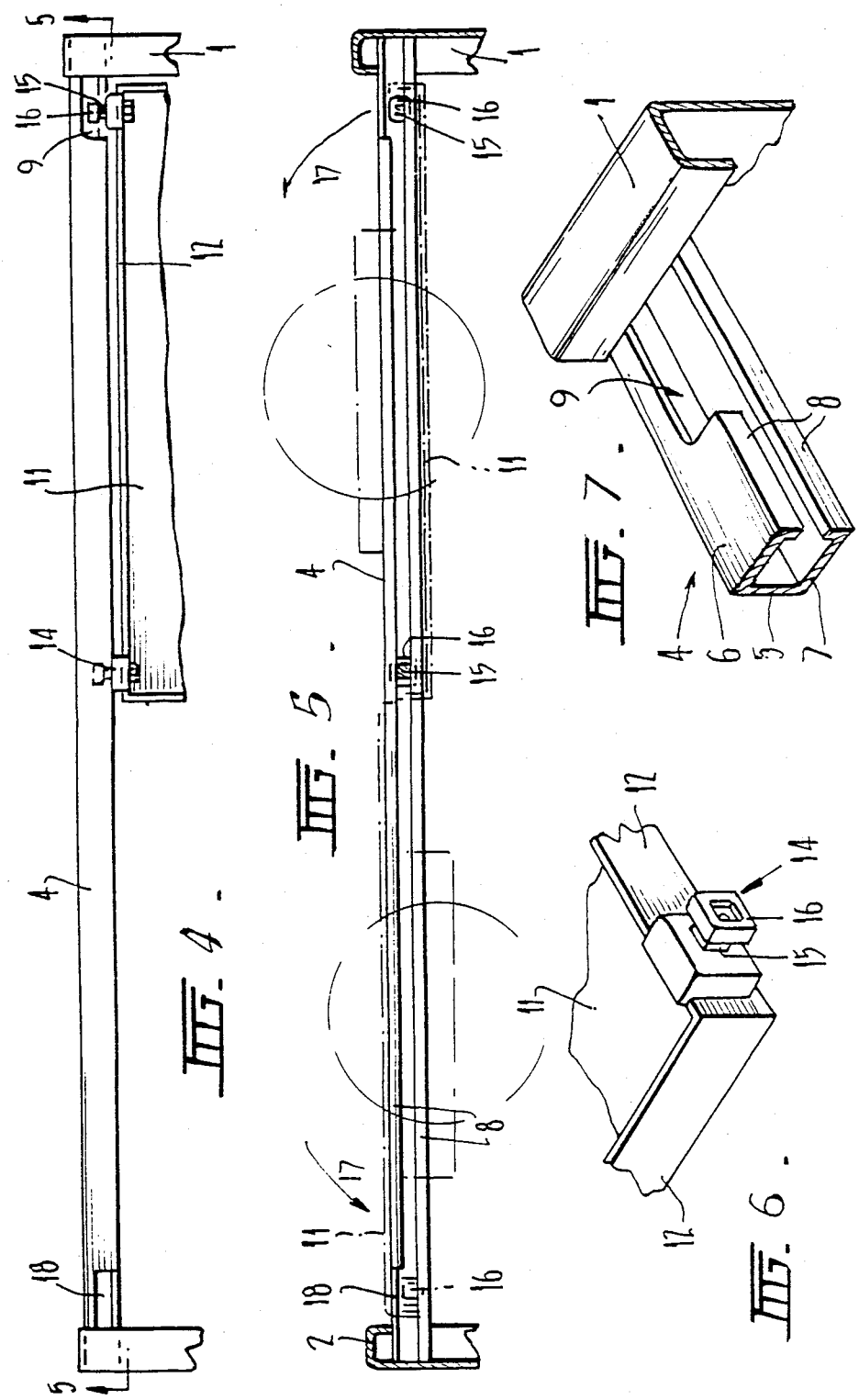

WORK TABLE FOR SAWS AND OTHER TOOLS

This invention relates to an improved work table for saws and other tools and has been devised particularly though not solely for use with portable power tools such as portable circular saws.

In the past work tables for saws of the type described in my Australian Patent Specification No. 499,634 and incorporating a pair of spaced horizontally extending guide members on which is mounted a saw supporting plate engaged with and guided by the guide members for movement in a horizontal plane have had a number of disadvantages. Firstly, it is a problem with such work tables that it is necessary to invert the saw supporting plate when altering the mode of the work table from a docking saw mode to a bench saw mode and to perform this operation it has generally been necessary to totally withdraw the saw supporting plate from one end of the guide channels, invert the plate, and reinsert the plate into the guide channels in the inverted position. This operation is cumbersome and time consuming to perform and furthermore necessitates that the work table be designed so as to have at least one open end for access to the guide members to enable the saw supporting plate to be withdrawn. This design constraint can result in a cumbersome construction which also has structural weaknesses.

It is also desirable to provide work tables for saws of this type in which it is possible to simply and accurately guide the work piece to be cut in a desired cutting mode. Various work tables in the past have proposed different forms of guide fences which require time and skill to set up accurately to achieve the desired width of accurate cut or to position the work piece accurately in relationship to the cutting tool.

It is therefore an object of the present invention to provide a work table for a saw which will obviate or minimize the foregoing disadvantages in a simple yet effective manner or which will at least provide the public with a useful choice.

In the present specification the word "saw" should be understood to include other power tools requiring generally horizontal guided movement or means for mounting the same above or below a work supporting surface. Such tools are not limited to, but could well include, power driven jigsaws and routers.

The word "horizontal" should also be understood to include other planes in which it may be desired to operate the saw supporting plate.

Accordingly in one aspect the invention consists in a work table for a saw or the like power tool as herein defined, said work table being of the type incorporating a pair of spaced horizontally extending guide members, a saw supporting member engaged with and guided by said guide members for movement in a horizontal plane, and a work support plate locatable as desired either below the saw supporting member for operation in a docking saw mode, or above the saw supporting member for operation in a bench saw mode, characterized in that the saw supporting member is constructed and arranged so that it may be inverted from a first position wherein the blade of a saw mounted on said saw supporting member projects downwardly for use in the docking saw mode, to a second position wherein the saw blade projects upwardly for use in the bench saw mode, without completely disengaging or removing the saw supporting member from the guide members.

Preferably said guide members comprise channel section members having the open sides thereof facing toward one another and wherein the saw supporting member incorporates pairs of runners at or toward either end thereof projecting outwardly from the sides of said saw supporting member and engaging the channel section guide members.

Preferably said channel section guide members have the upper flanges thereof cut away or relieved adjacent either end thereof allowing one pair of runners to be lifted upwardly from the guide members through the relieved portions by rotation of the saw supporting member about the other pair of runners.

In a further aspect the invention consists in a work table for a saw or the like power tool as herein defined, said work table being of the type incorporating a work support plate located above a saw supporting member so that the blade of the saw protrudes upwardly through the plate for operation of the work table in a bench saw mode, characterized in that the work support plate incorporates at least one longitudinal slot sized and spaced to receive the blade of a saw mounted on the saw supporting member, and two or more lateral slots adapted to engage clamping feet of a guide fence arrayed generally parallel to the longitudinal slot, and wherein said guide fence incorporates viewing windows through which may be read calibrations on scales on the work support plate showing the spacing of the guiding edge of the fence from the near edge of a saw blade protruding through the longitudinal slot.

Preferably said work support plate is adapted to be mounted in two alternative positions by rotating the plate through 180 degrees in a horizontal plane, and is provided with a second longitudinal slot adapted to align with the saw blade when the work support plate is so rotated from a first normal ripping position into a second wide ripping position.

Preferably said work support plate is provided with a second set of calibrations viewable through the windows in said guide fence and showing the distance of the guide face of the guide fence from the near edge of a saw blade located in the second longitudinal slot when the work support plate is in the wide ripping position.

Preferably the windows in said guide fence and the calibrations on said work support plate are so positioned that when the fence is located to feed work to the saw blade according to the appropriate positioning of the work support plate in either position thereof, then only the appropriate calibration showing the distance of the fence from the saw blade in the appropriate longitudinal slot may be read through the windows in the fence.

Figure 2:
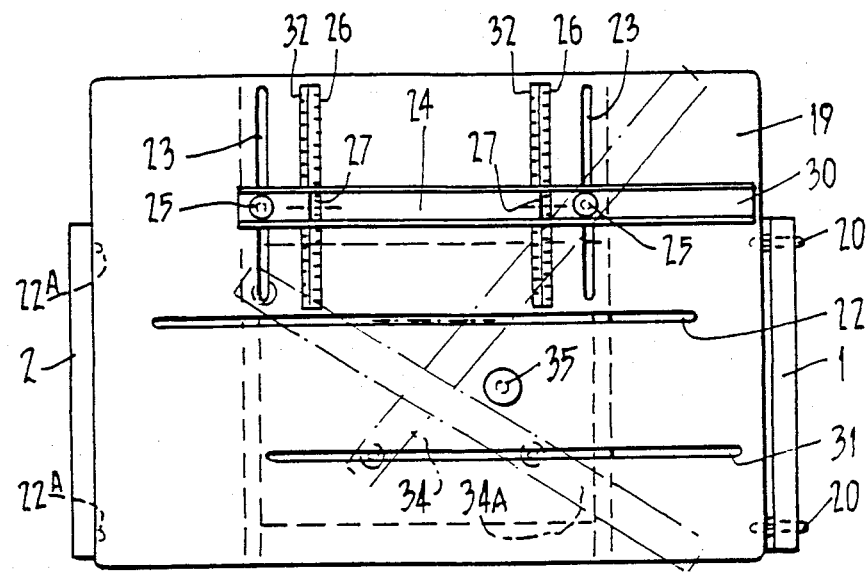
Figure 3:
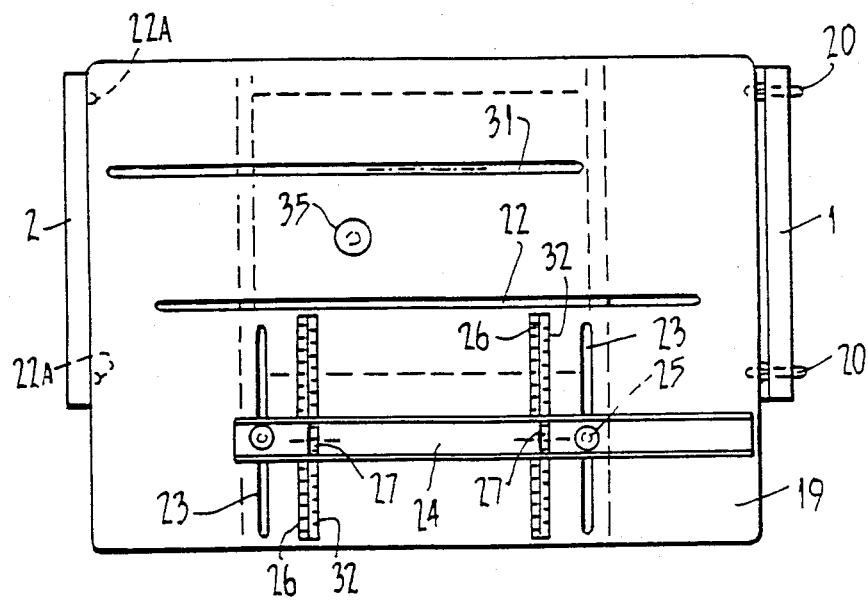

Notwithstanding any other forms that may fall within its scope one preferred form of the invention and variations thereof will now be described with reference to the accompanying drawings in which:

FIG. 1 is a general perspective view of a work table for a saw according to the invention showing the table arranged in a docking saw mode, FIG. 2 is a plan view of the work table showing the work support plate arranged in a bench saw mode in a normal ripping position, FIG. 3 is a similar plan to FIG. 2 showing the work support plate arranged in a wide ripping position, FIG. 4 is a plan view to an enlarged scale of one of the guide members of the work table showing the engagement therewith of the saw supporting plate, FIG. 5 is a cross-sectional elevation of the components shown in FIG. 4 further showing the transformation of the saw supporting plate from the docking saw mode to the rip saw mode, FIG. 6 is a scrap perspective view to an enlarged scale showing one of the runners on the saw supporting plate which engage with the guide channels, FIG. 7 is a scrap perspective view to an enlarged scale of one end of a guide member supported by the end panel of the work table, FIG. 8 is a scrap perspective view of a portion of the guide fence showing one of the windows therein, FIG. 9 is a scrap view of one of the calibrated scales on the work support plate, and FIG. 10 is a scrap elevation of an alternative form of runner and guide channel.

In the preferred form of the invention a work table particularly adapted for use with a portable circular saw but which may also be used with other portable power tools such as jigsaws or routers is constructed as follows:

The work table comprises end members 1 and 2 which may be formed from any suitable material but which are preferably bent up from sheet metal and which are connected at their lower corners by frame bars 3 and at their upper corners by guide members 4. The guide members are generally channel shaped in cross-section as can clearly be seen from FIG. 7, having a vertical web 5 and horizontal flanges 6 and 7. The flanges are provided with re-entrant edges 8 forming a generally C-shaped cross-section. The upper flange in each guide member is relieved or cut away at each end adjacent the end members 1 or 2 in a relieved portion 9.

The work table is provided with a saw supporting member 10 which in the preferred form of the invention is of a generally tray like configuration having a planar base 11 and a peripheral flange 12. The saw supporting plate incorporates an opening 13 through which the blade of a circular saw may protrude. The circular saw may be mounted to the saw supporting plate in any convenient manner for example by clamps or bolts. Alternatively the saw supporting member may take any other convenient form such as an adjustable frame formed from components which may be fastened together by bolts in slotted channels to enable the frame to be adjusted in size to suit all sizes of saw or router etc.

The saw supporting plate is mounted in the side members by way of runners 14 protruding outwardly in opposed pairs from either side of the saw supporting plate adjacent the corners. Each runner (FIG. 6) incorporates a shank portion 15 and a head portion 16. The shank portion may be round or square in cross-section and has a maximum diagonal dimension the same as or slightly less than the opening between the re-entrant edges 8 of the guide members. The head 16 has a larger diameter than the opening between the re-entrant edges 8 and is engaged behind the re-entrant edges as may be seen in FIG. 4 to retain the runner in position. The runner may be formed of any suitable material but is preferably of a self lubricating plastics material such as nylon.

In this manner the saw supporting plate is engaged with the guide members for movement in a horizontal plane so that the saw supporting plate can slide backwards and forwards between the guide members along the length of the work table.

In an alternative embodiment of the device the runners may be dovetail shaped as shown at 40 in FIG. 10 and the channel shaped guide members provided with a corresponding re-entrant ramp surface 41. The guide channels have a vertical web 5 and horizontal flanges 6 and 7 as before. The runners are fastened to the peripheral flanges 12 of the saw supporting plate by a bolt or screw 42. This alternative configuration of the runners and guide channels has the advantage that the weight of the power tool and the support plate or frame holds the runner down on the ramp surface 41. The wedging action provided by the mating inclined faces eliminates any side play in the support plate giving greater cutting accuracy. The inclined face also reduces the tendency to trap saw dust which otherwise packs under the runner resulting in a stiffer slide action.

To change the mode of the work table from a docking saw mode as shown in FIG. 1 to a rip saw mode it is necessary to invert the saw supporting plate so that the saw blade which was protruding downwardly beneath the plate in the docking saw mode will now protrude upwardly above the plate in the rip saw mode. To invert the plate it is first moved to the position shown in FIG. 4 where the runners adjacent the end member 1 are located immediately below the recess 9. The end of the plate adjacent the end member 1 may then be lifted allowing the runners adjacent the end member to become disengaged from the guide members through the cut away portions 9, whereupon the saw supporting plate may be rotated about the shanks of the other pair of runners as generally shown by the arrows 17 (FIG. 5) until the runners descend through the cut away portions 18 at the opposite end of the guide members. To facilitate this operation it is desirable although not essential that the spacing between the runners on each side of the saw supporting plate is one half of the spacing between the cut away portions 9 and 18 at each end of the guide members so that it is not necessary to slide the centrally located runners in the guide members during the inverting operation.

In this manner the saw supporting plate may be quickly and simply inverted from a first position where the blade of a saw mounted on the plate projects downwardly for use in the docking saw mode to a second position where the saw blade projects upwardly for use in the bench saw mode without disengaging the saw supporting plate from the guide members. This operation is quick, simple and foolproof to perform and is therefore a significant advance over the methods of inverting the saw supporting plate used in previous types of work table.

The work table is also provided with a work support plate 19 which may be mounted below the saw support plate as shown in FIG. 1 in the docking saw mode or which may be simply removed using clamps 20 and repositioned above the work support plate and the guide members in a rip saw mode as shown in FIGS. 2 and 3. In this mode the clamps 20 are repositioned in holes 21 in the end member 1 to engage correspondingly aligned apertures in the edges of the work support plate. The plate is supported at the opposite end by engaging projections 22A on the end member 2 with suitably spaced apertures in the end of the work support plate.

The work support plate is provided with a longitudinal slot 22 positioned in the plate so that the blade of a circular saw projects upwardly through the slot 22 when the work table is positioned in the normal rip saw mode as shown in FIG. 2. The work support plate is also provided with a pair of lateral slots 23 and a ripping guide fence 24 which is clamped to the work support plate by clamps 25 having feet engagable with the lateral slots 23. The fence is positioned by loosening the clamps 25, locating the fence in the desired position by sliding the feet of the clamps in the lateral slots 23, and then retightening the clamps 25.

To assist the location of the fence 24 the work support plate is provided with lateral calibrations 26 and the fence is provided with windows 27 which are aligned with the calibrations 26 and provided with datum measurement lines 28 (FIG. 8). The calibrations are marked and positioned on the work support plate such that they show the exact measurement of the adjacent edge of the circular saw blade to the inner face 29 of the fence when aligned with the datum marks 28. The calibrations are in fact positioned to read the distance of the fence face 29 from a position one half of a saw blade width from the centre of the longitudinal slot 22 and to achieve greater accuracy the fence may be set to a zero position and the saw blade positioned directly against the face 29 of the fence when clamping or positioning the saw onto the supporting plate 11. In this manner the ripping fence 24 may be quickly and accurately positioned to give the desired width of cut when the work table is used in a ripping bench saw mode. The work is fed into the saw blade from end plate 1 of the work table and for this reason the fence 24 is provided with a longer lead-in portion 30 toward the end 1 of the work table.

Although the positioning of the longitudinal slot 22 and the ripping fence 24 gives a range of ripping widths which are adequate for most purposes there are occasions on which it is desired to rip cut material which is wider than can be coped with using the set up shown in FIG. 2. To deal with this situation the work support plate is provided with a second longitudinal slot 31 offset from the first longitudinal slot 22 and the work support plate may be released from the clamps 20 and rotated in a horizontal plane through 180° to a position shown in FIG. 3. The plate is then once again reclamped and held in position using the clamps 20. The second longitudinal slot 31 is positioned to align with the circular saw blade in the "wide rip" position shown in FIG. 3 and the ripping fence 24 is now located on the opposite side of the blade and positioned further from the blade due to the asymmetrical design of the work supporting plate. When the work supporting plate is rotated from the normal rip position as shown in FIG. 2 to the wide rip position as shown in FIG. 3 the ripping fence 24 is detached and reclamped onto the work support plate so that the lead-in portion 30 is once again located toward the feed end 1 of the work table. The work support plate is provided with a second set of calibrations 32 which may conveniently be located along-side the first set of calibrations 26 and the second set of calibrations show the spacing of the rip fence face 33 from the saw blade located in the second longitudinal slot 31. It is a feature of the invention that the windows 27 in the rip fence are offset and located so that when the rip fence and the work support plate are located in the wide rip mode as shown in FIG. 3 it is only possible to read the calibrations 32 corresponding to the wide rip mode through the windows 27. Similarly when the work support plate and fence are in the normal rip mode as shown in FIG. 2 it is only possible to read the normal rip calibrations 26 through the windows 27.

In this manner a system of calibrations is provided which is simple and quick to use and at the same time is adaptable in a relatively fool-proof manner between the normal rip configuration of the work table and the wide rip configuration.

It is a further feature of the invention that the lateral slots 23 have the same configuration as the longitudinal slots 22 and 31 so that the clamping feet used on the clamps 25 may also be engaged with the longitudinal slots 22 and 31. In this manner the rip fence 24 as well as being used in its normal parallel configuration as shown in solid outline in FIGS. 2 and 3 may also be positioned diagonally across the work support plate as shown in broken outline at 34 or 34A in FIG. 2. The diagonal positioning of the guide fence is appropriate for use when the work table is used in conjunction with a router. When the work table is used with a router the work support plate is provided with a circular hole 35 designed to align with the bit of a router mounted on the saw supporting plate 11 so that the router bit protrudes upwardly through the hole 35 when the work table is in the bench saw mode as shown in FIGS. 2 and 3. When the guide fence is located in its normal parallel position as shown in solid outline it would not be possible to place the guiding edge of the fence in close proximity to the hole 35 so therefore it is highly advantageous to be able to relocate the guide fence into the type of position shown in broken outline at 34 and 34A to bring the guiding face of the fence into close proximity to the hole 35. For certain types of routing operation the fence could be provided with built up spacing members located along the length of the fence on either side of the router bit so that outer faces of the spacing members are directly aligned with the centre of the router bit.

In this manner a work table for a saw or similar power tool is provided which is simple and quick to use and is flexible in operation between a number of different modes. It is a particular feature of the work table that the conversion from one mode to another can be achieved quickly and simply and in a manner which is comparatively foolproof so assisting the operator or user from making set up mistakes.

I claim:

1. A work table for a saw or the like power tool comprising
 a saw supporting assembly including a saw support member, first runner means for supporting said saw support member and second runner means for supporting said saw support member, said first and second runner means cooperating to support said saw support member in a horizontal plane;
 horizontal guide means including a pair of parallel spaced apart horizontally extending guide members for engageably receivingly supporting said first and second runner means for movement in a horizontal plane, whereby said saw support member is movable in a horizontal plane, said horizontal guide means including aperture means for passage of said first or second runner means therethrough to engage or disengage said first or second runner means with said pair of horizontally extending guide members
 a work support plate locatable either below the saw support member for operation in a docking saw mode or above the saw support member for operation in a bench saw mode,
 whereby said saw support member may be inverted from a first position, wherein the blade of a saw mounted on said saw support member projects downwardly for use in the docking saw mode, to a second position, wherein the saw blade projects upwardly for use in the bench saw mode, by disengaging one of said first or second runner means from said pair of horizontally extending guide members through said aperture means, rotating said saw support member in a vertical plane while retaining the other one of said first or second runner means in engagement with said pair or horizontally extending guide members and then reengaging said one of said first or second runner means with said pair of horizontally extending guide members through said aperture means.

2. The work table as claimed in claim 1, wherein said guide members comprise channel section members having a vertical web and upper and lower horizontal flanges, the open sides thereof facing toward one another; said first runner means comprises a pair of runners at or toward one end of said saw support member and projecting outwardly from the sides thereof; said second runner means comprises a pair of runners at or toward the other end of said saw support member and projecting outwardly from the sides thereof; said channel members engageably receivingly supporting said runners on respective sides of said saw support member.

3. The work table as claimed in claim 2, wherein said aperture means comprises a cut-away or relieved section of said upper flanges of said channel section guide members adjacent either end thereof allowing one pair of runners to be lifted upwardly from the guide members through the cut-away or relieved sections by rotation of the saw supporting member about the other pair of runners.

4. A work table for a saw as claimed in claim 2 wherein said channel section guide members incorporate re-entrant edges on the flanges thereof forming generally C-shaped sections, and said runners each comprise a shank portion protruding through the opening between said re-entrant edges and a head portion wider than the opening between said re-entrant edges, engaging in said channels behind said re-entrant edges.

5. A work table for a saw as claimed in claim 2 wherein said channel section guide members incorporate in cross-section a re-entrant inclined ramp surface at the free edge of the lower flange and wherein each said runner is substantially dovetail shaped in vertical section having the angle of the dovetail corresponding to the angle of incline of the ramp surface so that the lower inclined face of the dovetail runner slides on the re-entrant inclined ramp surface on the lower flange of the channel.

6. The work table as claimed in claim 1, wherein said work support plate is located above said saw supporting member and includes at least one longitudinal slot sized and spaced to receive the blade of a saw mounted on the saw supporting member, and two or more lateral slots adapted to engage clamping feet of a guide fence arrayed generally parallel to the longitudinal slot, and wherein said guide fence incorporates viewing windows through which may be read calibrations on scales on the work support plate showing the spacing of the guiding edge of the fence from the near edge of a saw blade protruding through the longitudinal slot.

7. A work table for a saw as claimed in claim 6 wherein said work support plate is adapted to be mounted in two alternative positions by rotating the plate through 180 degrees in a horizontal plane, and is provided with a second longitudinal slot adapted to align with the saw blade when the work support plate is so rotated from a first normal ripping position into a second wide ripping position.

8. A work table for a saw as claimed in claim 7 wherein said work support plate is provided with a second set of calibrations viewable through the windows in said guide fence and showing the distance of the guide face of the guide fence from the near edge of a saw blade located in the second longitudinal slot when the work support plate is in the wide ripping position.

9. A work table for a saw as claimed in claim 8 wherein the windows in said guide fence and the calibrations on said work support plate are so positioned that when the fence is located to feed work to the saw blade according to the appropriate positioning of the work support plate in either position thereof, then only the appropriate calibration showing the distance of the fence from the saw blade in the appropriate longitudinal slot may be read through the windows in the fence.

10. A work table for a saw as claimed in claim 6 wherein said at least one longitudinal slot is of the same nature as said lateral slots allowing the clamping feet on the fence to be engaged with any one of said at least one longitudinal slot or said lateral slots so that the fence may be positioned diagonally across the work support table.

* * * * *